US011205950B2

(12) United States Patent
Lau et al.

(10) Patent No.: US 11,205,950 B2
(45) Date of Patent: Dec. 21, 2021

(54) OVER VOLTAGE PROTECTION IN A VOLTAGE CONVERTER

(71) Applicant: Infineon Technologies Austria AG, Villach (AT)

(72) Inventors: Tiam Poh Lau, Munich (DE); Marcus Schaemann, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/795,072

(22) Filed: Feb. 19, 2020

(65) Prior Publication Data

US 2021/0257829 A1  Aug. 19, 2021

(51) Int. Cl.
  *H02M 1/32* (2007.01)
  *H02H 7/12* (2006.01)
  *H02M 3/335* (2006.01)

(52) U.S. Cl.
  CPC ............ *H02M 1/32* (2013.01); *H02H 7/1213* (2013.01); *H02M 3/33507* (2013.01)

(58) Field of Classification Search
  CPC ............................... H02H 7/1213; H02M 1/32
  See application file for complete search history.

(56) References Cited

U.S. PATENT DOCUMENTS

| 9,608,527 | B1* | 3/2017 | Choi ................. | H02M 3/33507 |
| 2007/0041224 | A1* | 2/2007 | Moyse ................. | H02M 3/157 363/21.01 |
| 2007/0253228 | A1* | 11/2007 | Morota ................ | H02M 3/335 363/21.12 |
| 2014/0043874 | A1* | 2/2014 | Tsou ....................... | H02H 3/02 363/56.01 |
| 2014/0167640 | A1* | 6/2014 | Knoedgen ............. | H05B 45/385 315/239 |
| 2018/0115174 | A1* | 4/2018 | Fahlenkamp ..... | H02M 3/33507 |

* cited by examiner

*Primary Examiner* — Alex Torres-Rivera
(74) *Attorney, Agent, or Firm* — Armis IP Law, LLC (57) ABSTRACT

An apparatus (such as a power converter circuit) includes s primary winding, an auxiliary winding, and an over-voltage protection circuit (such as a controller and corresponding one or more circuit components). The primary winding receives an input voltage. The auxiliary winding is magnetically coupled to the primary winding. The primary winding receives energy from the input voltage, the auxiliary winding receives the energy from the primary winding. The over-voltage protection circuit controls conveyance of the energy received from the primary winding through a discharge circuit path to a reference voltage (such as ground). Conveyance of the energy (as received from the auxiliary winding) associated with the input voltage through the discharge circuit path prevents damage to a respective power converter circuit during exposure of the input voltage to a power surge condition such as due to lightning.

30 Claims, 9 Drawing Sheets

OVER VOLTAGE PROTECTION IN A VOLTAGE CONVERTER

BACKGROUND

Conventional voltage regulators convert an input voltage into a respective output voltage. In certain instances, the conventional voltage regulator and corresponding input voltage being converted is exposed to a transient over voltage condition such as caused by lightning strikes or other conditions. As is well known, exposure of components to transient over-voltage above a threshold value can cause damage to a power source, resulting in the need to replace a respective voltage regulator or at least a damaged component.

One type of component susceptible to damage during an over-voltage condition is a MOSFET (Metal Oxide Semiconductor Field Effect Transistor). For example, if a voltage greater than a threshold value is applied between a drain and a respective source of a field effect transistor, the field effect transistor will be damaged and rendered inoperable.

Other types of components (such as semiconductor circuits, inductors, capacitors, etc.) in a respective power converter circuit are susceptible to damage via over-voltage conditions.

BRIEF DESCRIPTION

This disclosure includes the observation that conventional power supplies suffer from deficiencies. For example, as previously discussed, exposure of a respective voltage regulator and corresponding input voltage to a transient voltage can cause damage to the respective voltage regulator or a corresponding device powered by the voltage regulator.

Embodiments herein include novel ways of providing circuit protection against over-voltage conditions.

More specifically, embodiments herein include an apparatus. In one embodiment, the apparatus (such as a power converter circuit) includes a primary winding, an auxiliary winding, and an over-voltage protection circuit (such as a controller and corresponding one or more circuit components). The primary winding receives an input voltage being converted into an output voltage. The primary winding receives energy from the input voltage; the auxiliary winding and a secondary winding (magnetically coupled to the primary winding) receive the energy from the primary winding. During an over-voltage condition in which the input voltage is exposed to a transient condition such as lightning, a controller of the over-voltage protection circuit detects the over-voltage condition and controls conveyance of the energy received from the primary winding through a discharge circuit path (such as including the auxiliary winding, a diode, and a switch) to a reference voltage (such as ground).

In one embodiment, as further discussed herein, the discharge circuit path is activated via a respective controller and only activated when needed, reducing an amount of energy consumption.

Conveyance of the energy through the discharge circuit path as described herein protects the power converter circuit. For example, as further discussed herein, conveyance of the energy associated with the input voltage through the discharge circuit path during exposure of the input voltage to a power surge condition (such as due to lightning or other transient condition) prevents occurrence of damage to a respective power converter circuit. Before and after (as well as potentially during) an over-voltage condition, the power converter circuit powers a respective dynamic load. For example, in one embodiment as previously discussed, the power converter circuit also includes a secondary winding magnetically coupled to the primary winding. Via current through the primary winding supplied by the input voltage, the secondary winding produces an output voltage to power a dynamic load.

In accordance with further example embodiments, the apparatus (such as a power converter circuit, voltage converter, etc.) includes a capacitor in which to store the input voltage; the over-voltage protection circuit further includes a switch. Activation of the switch (such as in the discharge circuit path) conveys the energy from the auxiliary winding through the discharge circuit path to the reference voltage. In one embodiment, the over-voltage protection circuit conveys the energy received from the auxiliary winding through the discharge circuit path to the reference voltage in response to sensing that the input voltage is above a threshold value. The input voltage above a threshold value indicates a corresponding to a condition in which one or more component in the power converter circuit may be damaged due to an over-voltage of the input voltage. Keeping the magnitude of the input voltage below a predetermined magnitude prevents damage to the voltage converter.

In yet further example embodiments in which the apparatus includes a capacitor to store the input voltage, conveyance of the energy received from the auxiliary winding through the discharge circuit path during the over-voltage condition discharges the capacitor, reducing a magnitude of the input voltage supplied to the primary winding.

The power converter circuit as described herein can detect occurrence of an over-voltage condition associated with the input voltage in any suitable manner. For example, as previously discussed, the over-voltage can be detected based on the input voltage being above a threshold value. Additionally, or alternatively, the over-voltage condition can be detected based on monitoring an amount of current through the primary winding, monitoring of a magnitude of the voltage supplied by an auxiliary winding magnetically coupled to the primary winding, and so on.

Further embodiments of the apparatus as described herein include a switch in communication with a node of the auxiliary winding; and a controller that activates the switch to an ON state in response to detecting that the input voltage is above a threshold value. In a similar manner as previously discussed, activation of the switch to the ON state produces (completes) the discharge circuit path. In one embodiment, the discharge circuit path extends from a capacitor, which stores the input voltage, through a combination of the primary winding, the auxiliary winding, and the switch to the reference voltage.

In accordance with yet further embodiments, the auxiliary winding as described herein is a first auxiliary winding that powers the power converter circuit during non-over-voltage conditions of the input voltage. In one embodiment, activation of the discharge circuit path causes the voltage of the auxiliary winding to drop (such as reduce to an acceptable level) so that it no longer can be used to power circuitry in the voltage converter.

In accordance with further embodiments, the power converter circuit as described herein can be configured to include a second auxiliary winding magnetically coupled to the primary winding; the second auxiliary winding provides a backup source of power to the over-voltage protection circuit or corresponding circuitry associated with the voltage converter. The second auxiliary winding provides power to the power converter circuit (or components therein) during a condition in which an over-voltage exists on the input voltage and appropriate power from the first auxiliary winding is unavailable due to activation of the discharge circuit path.

Thus, in one embodiment, the first auxiliary winding powers the over-voltage protection circuit during first conditions in which a magnitude of the input voltage is below a threshold value (such as when no over-voltage condition is detected on the input voltage); and the second auxiliary winding powers the over-voltage protection circuit during second conditions in which the magnitude of the input voltage is above the threshold value (such as when an over-voltage condition is detected on the input voltage).

Accordingly, in certain embodiments, the first auxiliary winding and the second auxiliary winding supply power to the over-voltage protection circuit at different times depending on a magnitude of the input voltage. In a manner as previously discussed, it can be considered that the second auxiliary winding provides backup power to the controller during the over-voltage conditions.

In yet further example embodiments, a respective voltage produced by the second auxiliary winding tracks a magnitude of the input voltage. Monitoring of a magnitude of the respective voltage on the second auxiliary winding provides an indication if the over-voltage still exits on the input voltage. If the over-voltage condition on the input voltage no longer exists as detected via monitoring of the respective voltage on the second auxiliary winding (or some other voltage associated with the power converter circuit), the over-voltage protection circuit discontinues activating the discharge circuit path. In such an instance, after the voltage provided by the first auxiliary winding eventually increases to a magnitude of voltage greater than the voltage of the second auxiliary winding (backup winding) again, the first auxiliary winding powers the controller and corresponding circuitry (such as over-voltage protection circuit) instead of the second auxiliary winding powering the over-voltage protection circuit and controller.

Note that further embodiments herein include controlling a turn ratio of the primary winding and the auxiliary winding to provide a unique discharge circuit path. For example, in one embodiment, the turn ratio of the primary winding to the first auxiliary winding (associated with the discharge circuit path) is X turns to 1 turn, where X is greater than 5. Thus, in one embodiment, the voltage outputted from the auxiliary winding is substantially lower in magnitude than the magnitude of the input voltage or corresponding transient voltage. This makes it easier to implement a respective discharge circuit path as described herein.

In accordance with further example embodiments, the power converter circuit includes a controller and a primary winding switch coupled to the primary winding. Via input from the controller, the primary winding switch controls a flow of current sourced from the input voltage through the primary winding. During the over-voltage condition with respect to the input voltage, the controller controls (such as reduces) a duration of activating the primary winding switch (relative to a normal mode of operating the switch) in response to detecting the over-voltage condition such as that a magnitude of the input voltage is above a threshold value. Activation of the primary winding switch (such as in conjunction with activating the discharge circuit path as previously discussed) helps to discharge the unwanted over-voltage transient condition associated with the input voltage. Adjusted activation of current through the primary winding also maintains a magnitude of the output voltage within a desired range. For example, reducing the duty cycle and/or frequency of activating the primary winding switch during the over-voltage condition prevents the output voltage from spiking above a dangerous output voltage threshold value that would damage the respective load driven with the output voltage.

Note further that the operation of controlling the primary winding switch can vary depending on the embodiment. For example, in one embodiment, the controller reduces an average duration of activating the primary winding switch via one or more control functions such as: adjustment of a frequency of activating the primary winding switch; and/or adjusting a pulse width of activating the primary winding switch.

Embodiments herein are useful over conventional techniques. For example, the over-voltage protection circuitry (and activation of the novel discharge circuit path associated with an auxiliary winding) as described herein can support one or more advantages such as: i) preventing damage to a respective power converter circuit, ii) reducing the need to implement high voltage switches in the power converter, iii) providing a condition in which the bus voltage is discharged properly before the controller loses its VCC supply even after the AC is turned off, iv) providing operation in which the bus voltage is monitored during the discharge, such as based on the forward winding Vcc level or the Zcd winding negative voltage level.

In accordance with more specific embodiments, implementation of the over-voltage protection circuit as described herein in the context of an LED (Light Emitting Diode) driver design with input bus overvoltage protection is highly desired. In case of using the flyback topology for the LED driver power conversion, such protection can stop the corresponding switching (such as a MOSFET switching) in the voltage converter to better protect it from avalanche breakdown caused by maximum breakdown voltage being exceeded.

Additionally, as previously discussed, it is also desired to discharge the bus voltage after such protection has been triggered, so that the MOSFET switching can be reinitiated safely to recover the output voltage as soon as possible. For example, for LED applications, this means that the light will turn ON as soon as possible after an interruption due to an over-voltage such as a lightning strike.

Yet further, embodiments herein present the idea of discharging the bus voltage after the input bus overvoltage protection triggering, by utilizing the flyback MOSFET switching while not exceeding its maximum breakdown voltage.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices or processing hardware) to: receive an input voltage at a primary winding, the input voltage supplying energy to the primary winding; at an auxiliary winding magnetically coupled to the primary winding, receive the energy from the primary winding; and via an over-voltage protection circuit, control conveyance of the energy received by the auxiliary winding through a discharge circuit path to a reference voltage.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting switching power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

The foregoing and other objects, features, and advantages of the embodiments herein will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

An apparatus (such as a power converter circuit) includes s primary winding, an auxiliary winding, and an over-voltage protection circuit (such as a controller and corresponding one or more circuit components). The primary winding receives an input voltage. The auxiliary winding is magnetically coupled to the primary winding. The primary winding receives energy from the input voltage; the auxiliary winding receives the energy (conveyed via magnetically coupling in a respective transformer) from the primary winding. The over-voltage protection circuit controls conveyance of the energy received from the primary winding through a discharge circuit path (such as including the auxiliary winding, a diode, and a switch) to a reference voltage (such as ground). Conveyance of the energy associated with the input voltage through the discharge circuit path prevents damage to a respective power converter circuit during exposure of the input voltage to a power surge condition such as due to lightning.

Figure 1:
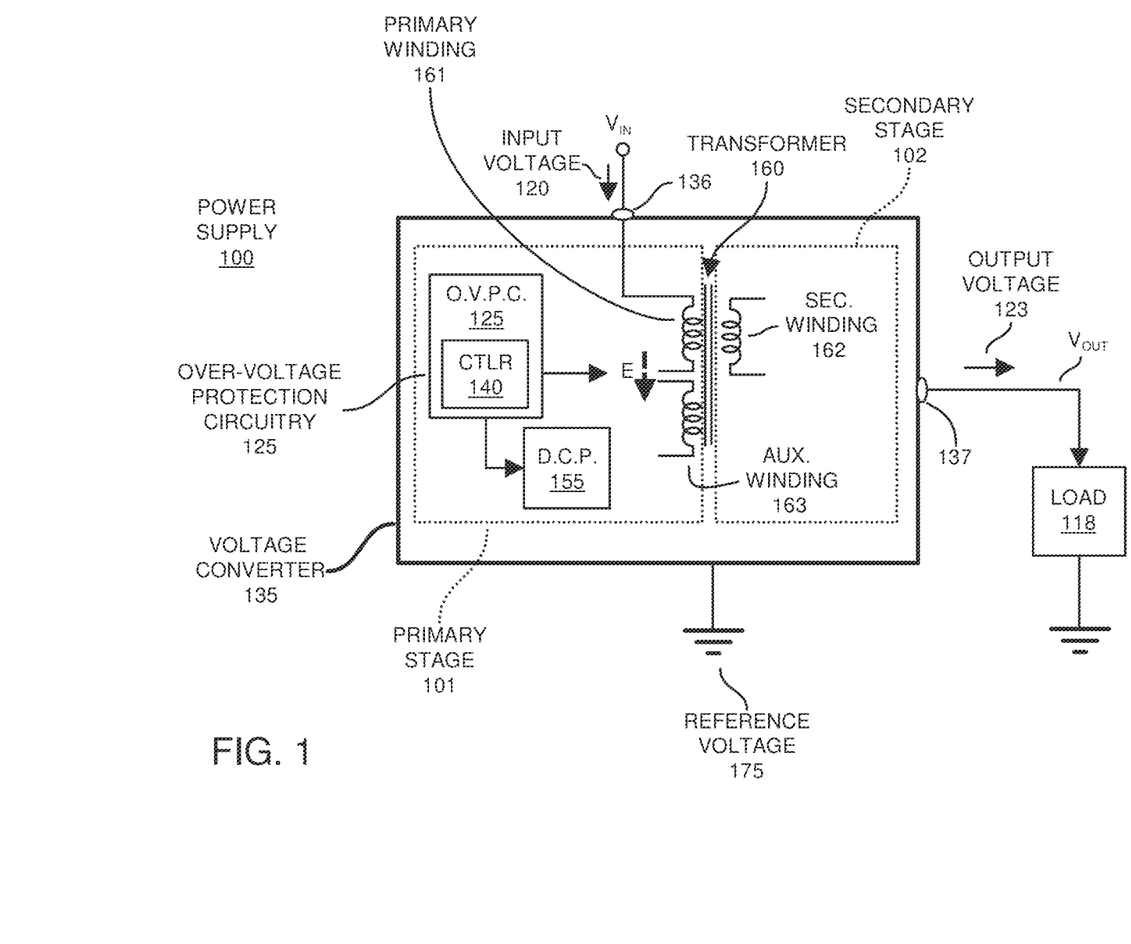
FIG. 1 is an example general diagram of a power supply supporting over-voltage protection according to embodiments herein.

Now, more specifically, FIG. 1 is an example general diagram of a power supply supporting over-voltage protection according to embodiments herein.

As shown in this example embodiment, the power supply 100 (such as an apparatus) includes voltage converter 135 powering the load 118. The voltage converter 135 include a controller 140, discharge circuit path 155, and a transformer 160. Controller 140 includes an over-voltage protection circuit 125 operable to control operation of discharge circuit path 155.

During normal operation, the controller 140 controls a flow of current through the primary winding 161 of transformer 160. Secondary winding 162 produces a respective output voltage 123 that powers the load 118.

The primary winding 161 receives energy from the input voltage 120 (input voltage source through port 136); the auxiliary winding 163 (magnetically coupled to the primary winding 161) receives the energy (such as magnetic energy E) from the primary winding 161. The secondary winding 162 receives energy from the primary winding 161 and produces output voltage 123 (outputted from port 137) that powers the load 118.

During an over-voltage condition in which the input voltage 120 is exposed to a transient condition such as lightning and the magnitude of the input voltage 120 increases, the controller 140 associated with the over-voltage protection circuit 125 detects the over-voltage condition and controls conveyance of the energy received from the primary winding 161 through a discharge circuit path 155 (such as including the auxiliary winding 163) to a reference voltage 175 (such as ground).

In one embodiment, conveyance of the energy (E) through the discharge circuit path 155 protects the voltage converter 135 and corresponding components. For example, as further discussed herein, conveyance of the energy received at the auxiliary winding 163 through the discharge circuit path 155 during exposure of the input voltage 120 to a power surge condition (such as due to lightning or other condition) prevents occurrence of damage to the respective voltage converter 135 and corresponding components.

Figure 2:
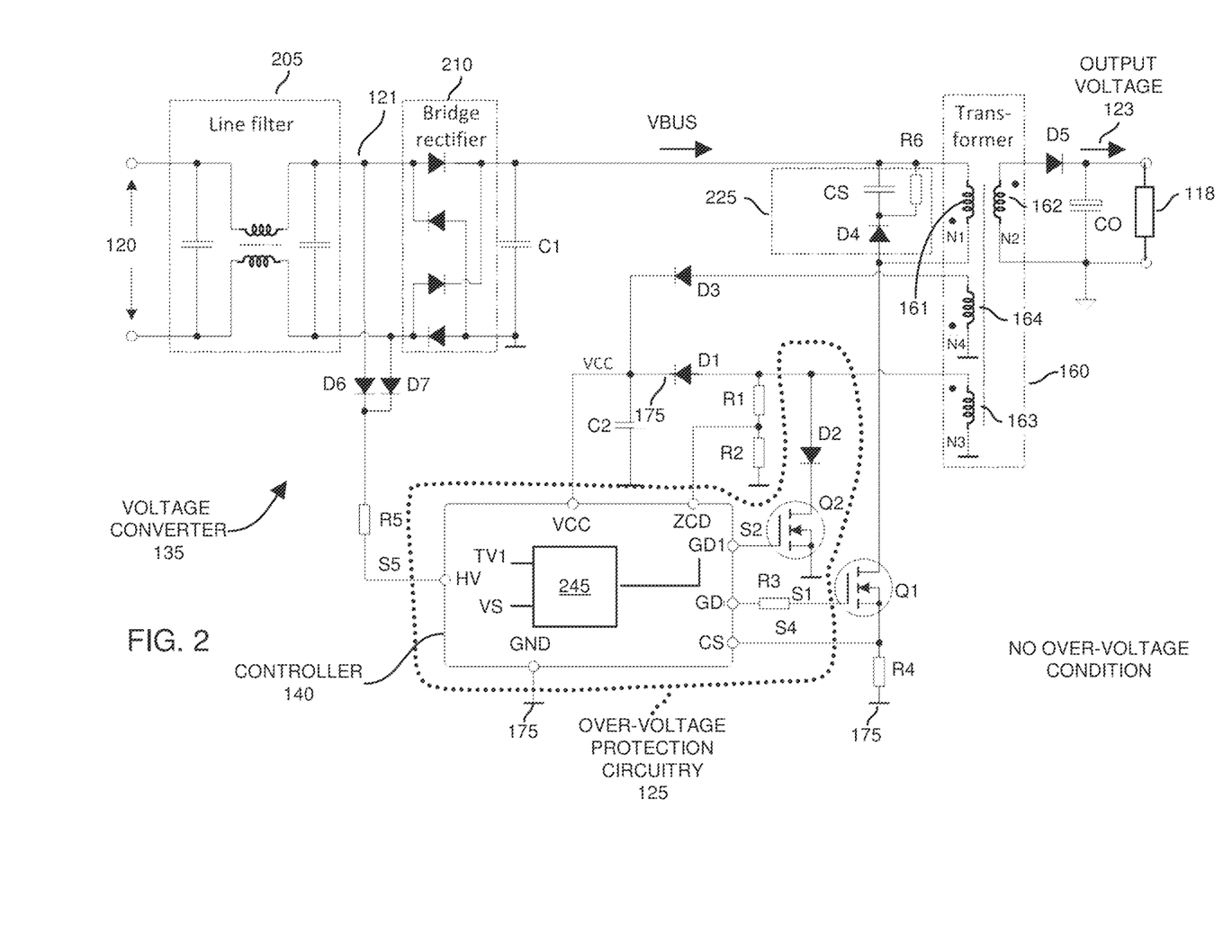
FIG. 2 is an example detailed diagram illustrating a power converter circuit operating in a normal (non-over-voltage) mode in which corresponding over-voltage protection circuit is deactivated according to embodiments herein.

FIG. 2 is an example detailed diagram illustrating a power converter circuit operating in a normal mode in which corresponding over-voltage protection circuit is deactivated according to embodiments herein. As further discussed herein, the deactivation of the over-voltage protection circuit is achieved by keeping switch Q2 continuously OFF (open circuit).

In this example embodiment, the voltage converter 135 includes line filter 205, bridge rectifier 210, capacitor C1, snubber circuit 225, transformer 160, diodes D1, D2, D3, D4, D5, D6, D 7, switch Q1, switch Q2, controller 140, resistor R 1, R 2, R 3, R 4, and R5.

Snubber circuit 225 includes capacitor CS, diode D4, and resistor R6. In general, the snubber circuitry 225 is an energy-absorbing circuit used to suppress the voltage spikes on the input voltage VBUS caused by the circuit inductance when a switch, electrical or mechanical, opens.

Transformer 160 includes primary winding 161 (having N1 turns), secondary winding 162 (having N2 turns), auxiliary winding 163 (having N3 turns), and second auxiliary winding 164 (having N4 turns).

In one embodiment, each of the windings associated with the transformer 160 are magnetically coupled to each other. For example, the secondary winding 162 is magnetically coupled to receive magnetic energy from the primary winding 161. Each of the first auxiliary winding 163 and the second auxiliary winding 164 are also magnetically coupled to receive magnetic energy from the primary winding 161.

The output stage of the voltage converter 135 includes secondary winding 162, diode D5, and output capacitor CO. As previously discussed, via the magnetic energy received from the primary winding 161, the combination of the secondary winding 162 and the diode D5 produce the output voltage 123.

Yet further, during operation, the line filter 205 initially receives raw input voltage 120. In one embodiment, the input voltage 120 is an AC voltage. As its name suggests, the line filter 205 filters the input voltage 120 to produce a filtered input voltage 121 supplied to the bridge rectifier 210. In one embodiment, the purpose of the line filter 205 is not only to filter the input voltage for the circuit to reduce incoming noise to voltage converter 135. Its purpose is also to filter the current drawn by the voltage converter 135 in order to draw a filtered current from input source 120 to avoid outgoing noise from the voltage converter 135 to input power source 120.

Diodes D6 and D7 pass the filtered input voltage 121 to the controller 140 through resistor R5.

Via the filtered input voltage 121 received from the line filter 205, the bridge rectifier 210 produces input voltage VBUS, which is inputted to the snubber circuit 225 and transformer 160. Thus, the input voltage, VBUS, is inputted to the primary winding 161 of the transformer 160. As previously discussed, the input voltage VBUS is converted to the output voltage 123 via transformer 160.

As further shown, the voltage converter 135 includes controller 140 and switch Q1. In one embodiment, the controller 140 pulses the switch Q1 between ON and OFF states, causing a respective flow of current through the primary winding 161 of the transformer 160. The pulsed flow of current through the primary winding 161 conveys energy associated with the received input voltage (VBUS) to each of the secondary winding 162, first auxiliary winding 163, and second auxiliary winding 164.

During normal mode of no over-voltage condition with respect to the input voltage VBUS, the auxiliary winding 163 produces a voltage that is greater than a voltage from auxiliary winding 164. Hence, during the normal mode (no over-voltage condition), the auxiliary winding 163 through diode D1 produces Vcc inputted to power controller 140.

In one embodiment, the voltage converter 135 powers the respective load 118 both before, during, and after the occurrence of a respective over-voltage condition. For example, in one embodiment, the power converter circuit (voltage converter 135) includes secondary winding magnetically 162 coupled to the primary winding 161. Via pulsed current through the primary winding supplied by the input voltage (VBUS), the secondary winding produces an output voltage 123 that powers the dynamic load 118.

In accordance with further example embodiments, as previously discussed, during the normal mode when there is no detected over-voltage condition, because switch Q2 is OFF, the switching of current through the primary winding 161 via pulsed signal S1 produced by the controller 140 causes the auxiliary winding 163 to generate a respective voltage (such as Vcc) that passes through diode D1 and is stored on capacitor C2 as previously discussed. The corresponding voltage Vcc powers the controller 140 and potentially other circuit components in the voltage converter 135.

In accordance with further example embodiments, the controller 140 includes a respective comparator 245. Comparator 245 compares a received signal VS (such as signal S5, S4, VCC, etc.) associated with the voltage converter 135 and compares it to an appropriate threshold value TV1. Note that the magnitude of the signal VS provides an indication whether the input voltage VBUS is greater than a threshold value. The signal S5, S4, Vcc, etc., above a threshold value TV1 indicates a transient over-voltage condition.

Thus, the power converter circuit (voltage converter 135) as described herein can detect occurrence of an over-voltage condition associated with the input voltage VBUS in any suitable manner. For example, as previously discussed, the over-voltage can be detected based on the input voltage VBUS being above a threshold value. Additionally, or alternatively, the over-voltage condition can be detected based on monitoring an amount of current through the primary winding 161 (such as via signal S4) above a respective threshold value, a magnitude of voltage such as VCC supplied by an auxiliary winding (such as winding 163) magnetically coupled to the primary winding 161 above a threshold value, and so on.

Figure 3:
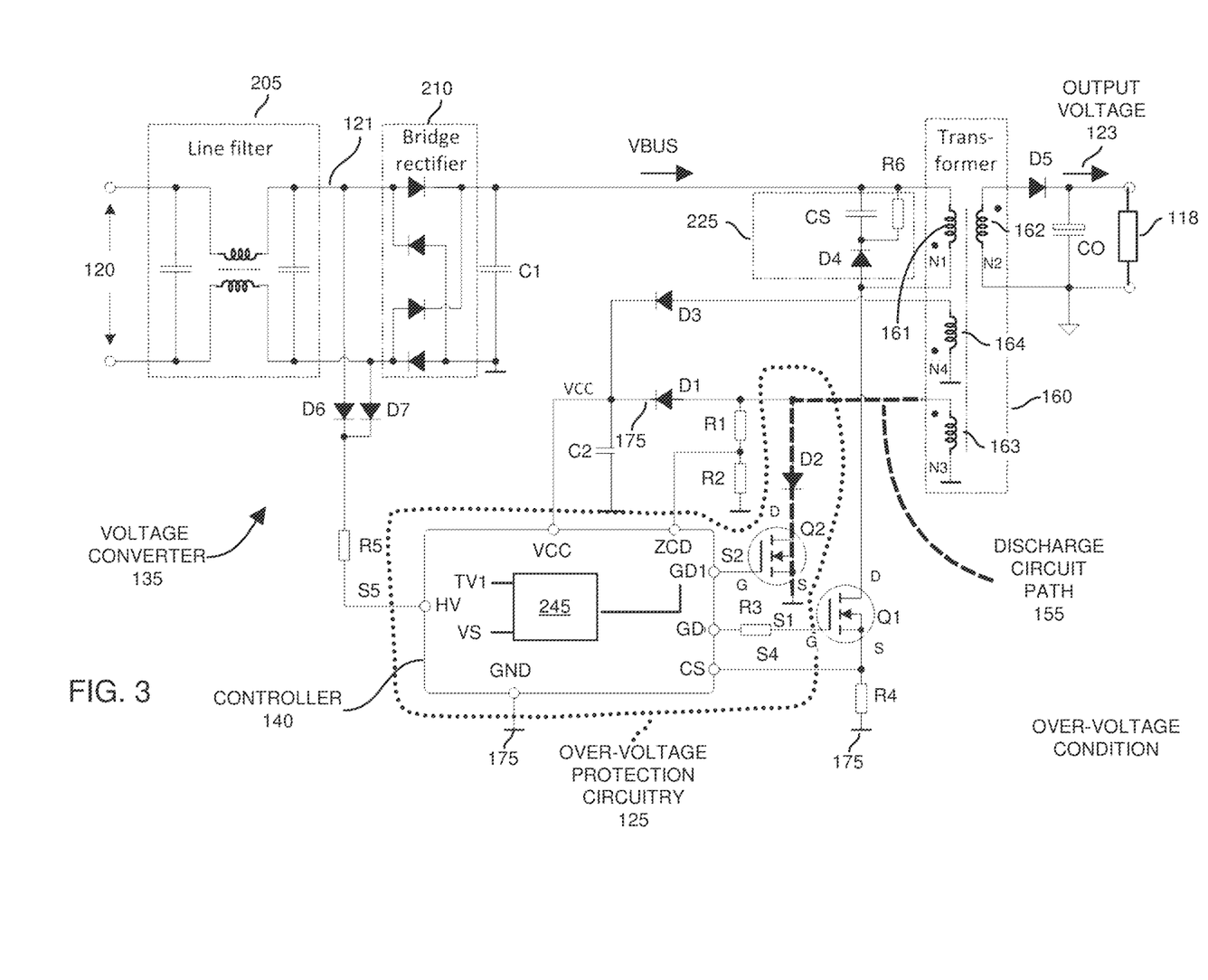
FIG. 3 is an example detailed diagram illustrating a power converter circuit operating in an over-voltage mode in which corresponding over-voltage protection circuit is activated according to embodiments herein.

As further discussed below, in response to detecting that the magnitude of the monitored signal VS (any of one or more signals) is greater than the threshold value TV1, which indicates a respective over-voltage condition associated with input voltage VBUS due to a respective transient condition, the controller 140 initiates activation of the discharge circuit path 155 by closing switch Q2 to a low impedance or short circuit state. This activation of the discharge circuit path 155 as shown in FIG. 3, reduces the magnitude of the reflected voltage on primary winding 160. This ensures that the combination of reflected voltage on primary winding 160 in addition to input voltage VBUS (which is temporarily a high voltage due to a transistor condition such as lightning) stored in capacitor C1 does not exceed the voltage rating of switch Q1. Additionally, as further discussed below, in response to detecting that the magnitude of the monitored signal VS is greater than the threshold value TV1, which indicates a respective over-voltage condition associated with input voltage VBUS due to a respective transient condition, the controller 140 adjusts control (such as frequency and or duty cycle) of pulsing switch Q1 ON and OFF to prevent the output voltage 123 from spiking above an output voltage threshold value.

FIG. 3 is an example detailed diagram illustrating a power converter circuit operating in an over-voltage mode in which corresponding over-voltage protection circuit is activated according to embodiments herein.

As previously discussed, the voltage converter 135 includes a capacitor C1 in which to store the input voltage VBUS; the over-voltage protection circuit 125 further includes switch Q2. During a detected over-voltage condition, activation of the switch Q2 (such as in the discharge circuit path 155) conveys the energy from the winding 163 through the discharge circuit path 155 to the reference voltage 175. Thus, in one embodiment, the over-voltage protection circuit 125 conveys the energy (current) received by slowly pulsing switch Q1 (ON and OFF) from the auxiliary winding 163 through the discharge circuit path 155 (via the closed switch Q2) to the reference voltage 175 in response to sensing that the input voltage VBUS (as determined from monitoring signal VS) is above a threshold value TV1. As previously discussed, detection of the input voltage VS above a threshold value indicates a corresponding condition in which one or more component in the power converter circuit may be damaged due to an over-voltage of the input voltage VBUS.

In yet further example embodiments, when the discharge circuit path 155 is activated via turning of switch Q2 ON, the discharge circuit path 155 extends from capacitor C1, which stores the input voltage VBUS, through a combination of the primary winding 161, the auxiliary winding 163, and the switch Q2 to the reference voltage 175. Conveyance of the energy received from the auxiliary winding 163 through the discharge circuit path 155 during the over-voltage condition discharges the capacitor C1, reducing a magnitude of the input voltage VBUS supplied to the primary winding 161.

Yet further, note again that the second auxiliary winding 164 provides power to the voltage converter 135 and corresponding controller 140 during a condition in which an over-voltage exists on the input voltage VBUS and appropriate power from the first auxiliary winding 163 is unavailable due to activation of the discharge circuit path 163. Thus, the diodes D1 and D3 provide an OR function to provide Vcc to the controller 140. That is, the winding 163 provides the voltage VCC to the controller 140 when discharge circuit path 155 is OFF (deactivated); winding 164 provides the voltage VCC to the controller 140 when discharge circuit path 155 is ON (activated).

In yet further example embodiments, a respective voltage produced by the auxiliary winding 164 tracks a magnitude of the input voltage VBUS during an over-voltage mode. Monitoring of a magnitude of the respective voltage on the auxiliary winding 164 provides an indication if the over-voltage condition still exits on the input voltage VBUS. If the over-voltage condition on the input voltage VBUS no longer exists as detected via monitoring of the respective voltage on the auxiliary winding 164 (or some other voltage associated with the power converter circuit), the over-voltage protection circuit 125 deactivates the discharge circuit path 155 by turning Q2 OFF (open circuit). In such an instance, the voltage provided by the first auxiliary winding 163 increases again and powers the controller 140 through diode D1 and corresponding over-voltage protection circuit 125 instead of the second auxiliary winding 164.

Note that further embodiments herein include controlling a turn ratio of the primary winding 161 (N1 turns) and the auxiliary winding 163 (N3 turns) to provide a unique discharge circuit path 155. For example, in one embodiment, the turn ratio of the primary winding 161 to the auxiliary winding 163 is X turns to 1 turn, where X is greater than 4 or 5. Thus, in one embodiment, the voltage outputted from the auxiliary winding 163 is substantially lower in magnitude than the magnitude of the input voltage VBUS or corresponding transient voltage. This makes it easier to implement a respective discharge circuit path 155 as described herein.

Note again that activation of the primary winding switch Q1 (such as in conjunction with activating the discharge circuit path 155 as previously discussed) during an over-voltage mode helps to discharge the unwanted over-voltage transient condition associated with the input voltage VBUS. Reducing the duty cycle of activating the primary winding switch Q1 during the over-voltage condition prevents the output voltage 123 from spiking above a dangerous output voltage threshold value that may otherwise damage the respective load 118 driven with the output voltage 123.

In yet further more specific example embodiments, upon detecting an input bus (VBUS) overvoltage triggering condition, the controller 140 activates Q2 to an ON state, allowing current to flow through the discharge circuit path 155. In one embodiment, the switch Q2 is turned ON (pulsed ON) to clamp the zero crossing detection winding (i.e., first auxiliary winding 163) demagnetization voltage to the approximate forward voltage drop of diode D2, so that when the switch Q1 is switching for the bus voltage discharge, the demagnetization voltage reflected on primary winding 161 will also be clamped to very low voltage as well.

In yet further example embodiments, since the high power factor associated with a quasi-resonant flyback converter (such as voltage converter 135) is typically designed with a high primary reflected voltage to achieve good efficiency and low iTHD (Total Harmonic Distortion), the overvoltage stress of the MOSFET switch Q1 during bus voltage discharge (via activation of the discharge circuit path 155) is significantly reduced as compared to without the clamping provided via the discharge circuit path 155.

Additionally, note that the clamping diode D2 is also acting as a bleeder of the transformer demagnetization energy.

During the discharge, the controller 140 (such as an integrated circuit) can be configured to receive voltage Vcc from the rectified output of the auxiliary winding 164. Since the auxiliary winding 164 rectified output is a ratio of the input bus voltage (VBUS), the corresponding received voltage Vcc (from the auxiliary winding 164) can be monitored to ensure the bus voltage (VBUS) is properly discharged before deactivating the clamping circuit (shutting OFF the discharge circuit path 155) and before initiating the restart of the flyback switching via pulsed activation of switch Q1.

Embodiments herein include advantages over conventional techniques. For example, via the over-voltage protection provided by the over-voltage protection circuit 125: i) there is no need for Q2 to be a high voltage switch, ii) there is no need for additional high-voltage switches in the voltage converter 135, iii) the bus voltage (VBUS) can be discharged properly before the controller 140 loses its VCC supply even after the input voltage AC is turned off, iv) the bus voltage (VBUS) is monitored during activation of the discharge circuit path 155 (such as based on the forward winding Vcc level or the Zcd winding negative voltage level).

Figure 4:
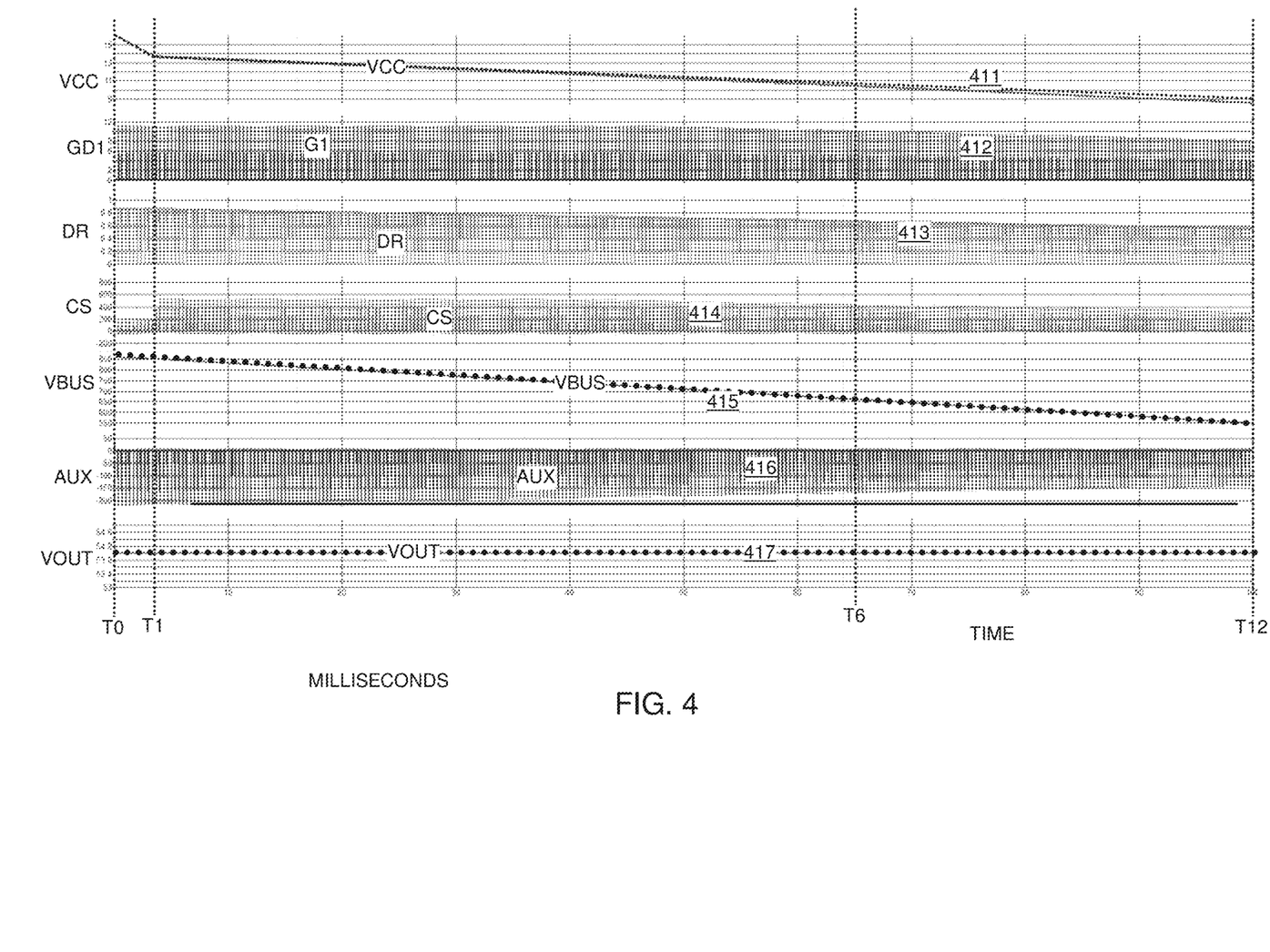
FIG. 4 is an example timing diagram illustrating signals associated with the voltage converter according to embodiments herein.

FIG. 4 is an example timing diagram illustrating signals associated with the voltage converter according to embodiments herein.

Timing diagram 411 indicates a magnitude of signal VCC over time.

Timing diagram 412 indicates a magnitude of signal GD1 over time.

Timing diagram 413 indicates a magnitude of DR over time.

Timing diagram 414 indicates a magnitude of CS over time.

Timing diagram 415 indicates a magnitude of VBUS over time.

Timing diagram 416 indicates a magnitude of AUX over time.

Timing diagram 417 indicates a magnitude of VOUT (output voltage 123 such as 54 VDC) over time.

At time T0, assume that the comparator 240 detects an over-voltage condition associated with the input voltage VBUS. In response to such a condition, the controller 140 turns the switch Q2 ON. Between time T0 and T1, the stored voltage on capacitor C2 supplies voltage VCC to the controller 140. Eventually, the voltage on the capacitor C2 sufficiently decreases such that the voltage from winding 164 through diode D3 supplies the voltage VCC on capacitor C2.

Between time T0 and time T12, the controller 140 pulses switch Q1, reducing a magnitude of the input voltage VBUS from 850 VDC at time T0 (such as 0 milliseconds) to 550 VDC at time T12 (such as 100 milliseconds). The activation of the discharge circuit path 155 between time T0 and T12 causes the voltage of the auxiliary winding 163 to drop (such as to eventually reduce VBUS) to an acceptable level at time T12.

Note that subsequent to detecting that the input voltage VBUS reduces to an acceptable level at time T12 such as based on monitoring a magnitude of the voltage VCC (which tracks the input voltage VBUS), the controller 140 associated with the over-voltage protection circuit 125 deactivates switch Q2 and pulses switch Q1 ON and OFF in a normal mode again to produce the output voltage 123 in a manner as previously discussed.

In one embodiment, the described clamping and discharge via the discharge circuit path 155 is simulated using the following settings:
  Switching frequency of Q1 reduced to 3 kHz while switch Q2 is closed
  CS peak voltage is 82.5 mV
  Leading edge blanking 200 ns
  These settings vary depending on the embodiment.

Figure 5:
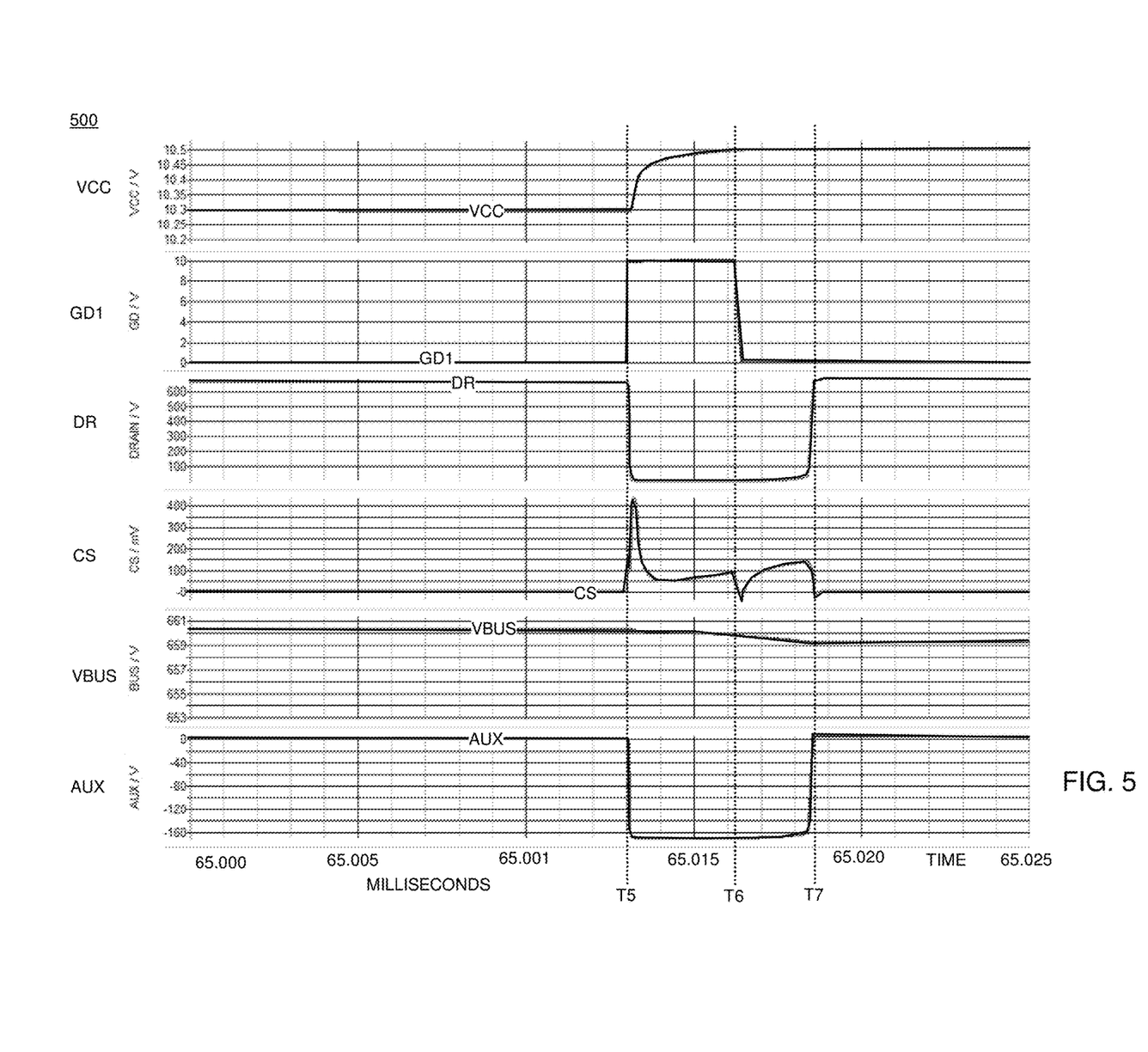
FIG. 5 is an example timing diagram illustrating signals associated with the voltage converter during an over-voltage condition according to embodiments herein.

FIG. 5 is an example timing diagram illustrating signals associated with the voltage converter during an over-voltage condition according to embodiments herein.

Timing diagram 500 shows a zoom in view of a single gate pulse applied to switch Q1 during the discharge phase. This pulse applied to the switch Q1 has a duration of approximately 320 nanoseconds, although this can be any suitable duration. Each cycle of controlling the switch Q1 ON for a predetermined or varying amount of time such as 320 nanoseconds (or other suitable value) between time T5 and time T6 and other time slots reduces the input voltage VBUS by a small step.

During the discharge phase, Q2 is ON and clamps the auxiliary winding 163 during the transformer demagnetization time to the voltage drop of D2 and Q2. As a consequence, the reflected voltage on primary winding 161 is small, causing the drain voltage DR to be only slightly higher than the input voltage VBUS.

Without the discharge path and the activation of Q2, the reflected voltage on the primary winding 161 during demagnetization would be the reflection of the output voltage 123. In one embodiment, this could be as high as 54 V times the turns ratio of primary winding 161 to secondary winding 162. In yet further example embodiments, since the high power factor associated with a quasi-resonant flyback converter (such as voltage converter 135) is typically designed with a high turns ratio to achieve good efficiency and low iTHD (Total Harmonic Distortion), the reflected voltage could be as high as 150 V to 200 V. Thus, without the clamping of Q2, the addition of bus voltage VBUS and reflected voltage at the drain node DR would easily exceed the breakdown voltage of MOSFET Q1 and damage the MOSFET. The timing diagram 500 shows that the clamping of Q2 results in the voltage at DR not being much higher than voltage VBUS, thus protection the MOSFET.

Figure 6:
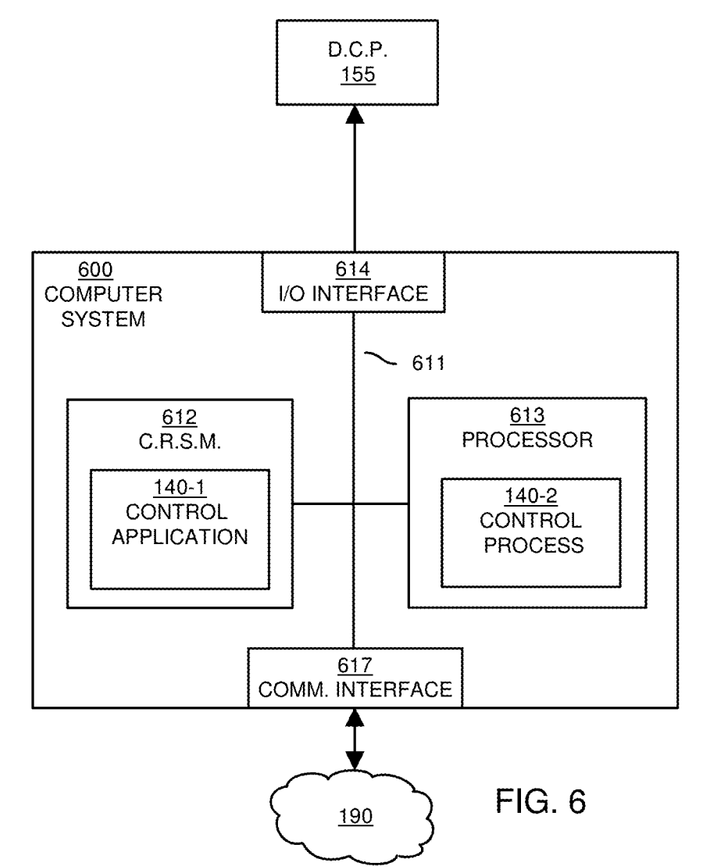
FIG. 6 is an example diagram illustrating computer processor hardware and related software instructions to execute methods according to embodiments herein.

FIG. 6 is an example diagram illustrating computer processor hardware and related software instructions to execute methods/operations according to embodiments herein.

As shown, computer system 600 (such as implemented by any of one or more resources such as controller 140, over-voltage protection circuit 125, comparator 240, etc.) of the present example includes an interconnect 611 that couples computer readable storage media 612 such as a non-transitory type of media (or hardware storage media) in which digital information can be stored and retrieved, a processor 613 (e.g., computer processor hardware such as one or more processor devices), I/O interface 614, and a communications interface 617.

I/O interface 614 provides connectivity to any suitable circuitry such as power converter circuit 135.

Computer readable storage medium 612 can be any hardware storage resource or device such as memory, optical storage, hard drive, floppy disk, etc. In one embodiment, the computer readable storage medium 612 stores instructions and/or data used by the control application 140-1 to perform any of the operations as described herein.

Further in this example embodiment, communications interface 617 enables the computer system 600 and processor 613 to communicate over a resource such as network 190 to retrieve information from remote sources and communicate with other computers.

As shown, computer readable storage media 612 is encoded with control application 140-1 (e.g., software, firmware, etc.) executed by processor 613. Control application 140-1 can be configured to include instructions to implement any of the operations as discussed herein.

During operation of one embodiment, processor 613 accesses computer readable storage media 612 via the use of interconnect 611 in order to launch, run, execute, interpret or otherwise perform the instructions in control application 140-1 stored on computer readable storage medium 612.

Execution of the control application 140-1 produces processing functionality such as control process 140-2 in processor 613. In other words, the control process 140-2 associated with processor 613 represents one or more aspects of executing control application 140-1 within or upon the processor 613 in the computer system 600.

In accordance with different embodiments, note that computer system 600 can be a micro-controller device, logic, hardware processor, hybrid analog/digital circuitry, etc., configured to control a power supply and perform any of the operations as described herein.

Functionality supported by the different resources will now be discussed via flowchart in FIG. 7. Note that the steps in the flowcharts below can be executed in any suitable order.

Figure 7:
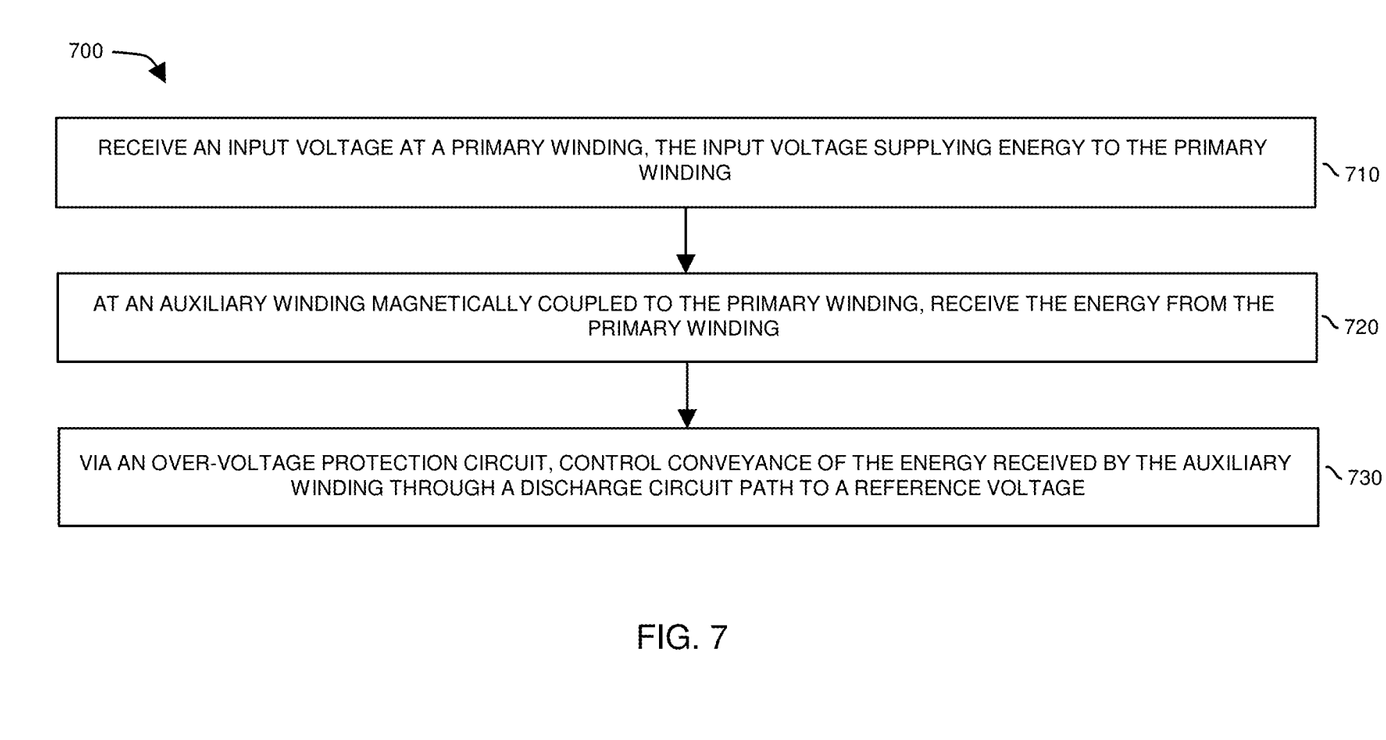
FIG. 7 is an example diagram illustrating a method according to embodiments herein.

FIG. 7 is an example diagram illustrating a method of controlling a power converter during over-voltage condition according to embodiments herein.

In processing operation 710, the voltage converter 135 receives an input voltage 120 at a primary winding 161; the input voltage 120 supplies energy (E) to the primary winding 161.

In processing operation 720, the auxiliary winding 163, which is magnetically coupled to the primary winding, receives the energy (such as magnetic E) from the primary winding 161.

In processing operation 730, via an over-voltage protection circuit 125, the controller 140 controls conveyance of the energy (such as magnetic energy converted to current) received by the auxiliary winding 163 through a discharge circuit path 155 to a reference voltage 175.

Figure 8:
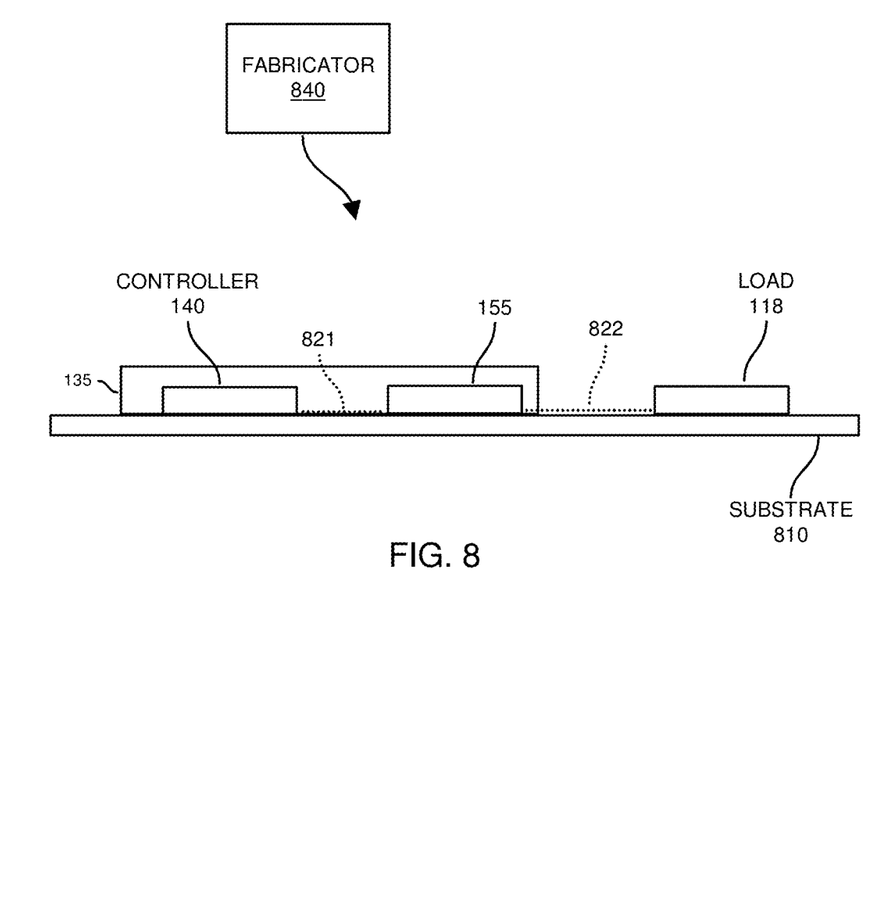
FIG. 8 is an example diagram illustrating fabrication of a circuit according to embodiments herein.

FIG. 8 is an example diagram illustrating fabrication of a power converter circuit on a circuit board according to embodiments herein.

In this example embodiment, fabricator 840 receives a substrate 810 (such as a circuit board).

The fabricator 840 further affixes the voltage converter 135 (such as including controller 140 and over-voltage protection circuit 125 and corresponding components) to the substrate 810. Via circuit paths 821 (such as one or more traces, etc.), the fabricator 840 couples the controller 140 to the discharge circuit path 155.

Via one or more circuit paths 822 (such as one or more traces, etc.), the fabricator 840 couples the power converter 135 to the load 118. In one embodiment, the circuit path 822 conveys the output voltage 123 generated from the power converter 135 to the load 118.

Accordingly, embodiments herein include a system comprising: a substrate 810 (such as a circuit board, standalone board, mother board, standalone board destined to be coupled to a mother board, etc.); a power converter 135 including corresponding components as described herein; and a load 118. As previously discussed, the load 118 is powered based on conveyance of output voltage 123 and corresponding output current conveyed over one or more circuit paths 822 from the power converter 135 to the load 118.

Note that the load 118 can be any suitable circuit or hardware such as one or more CPUs (Central Processing Units), GPUs (Graphics Processing Unit), LEDs and ASICs (Application Specific Integrated), which can be located on the substrate 810 or disposed at a remote location.

Figure 9:
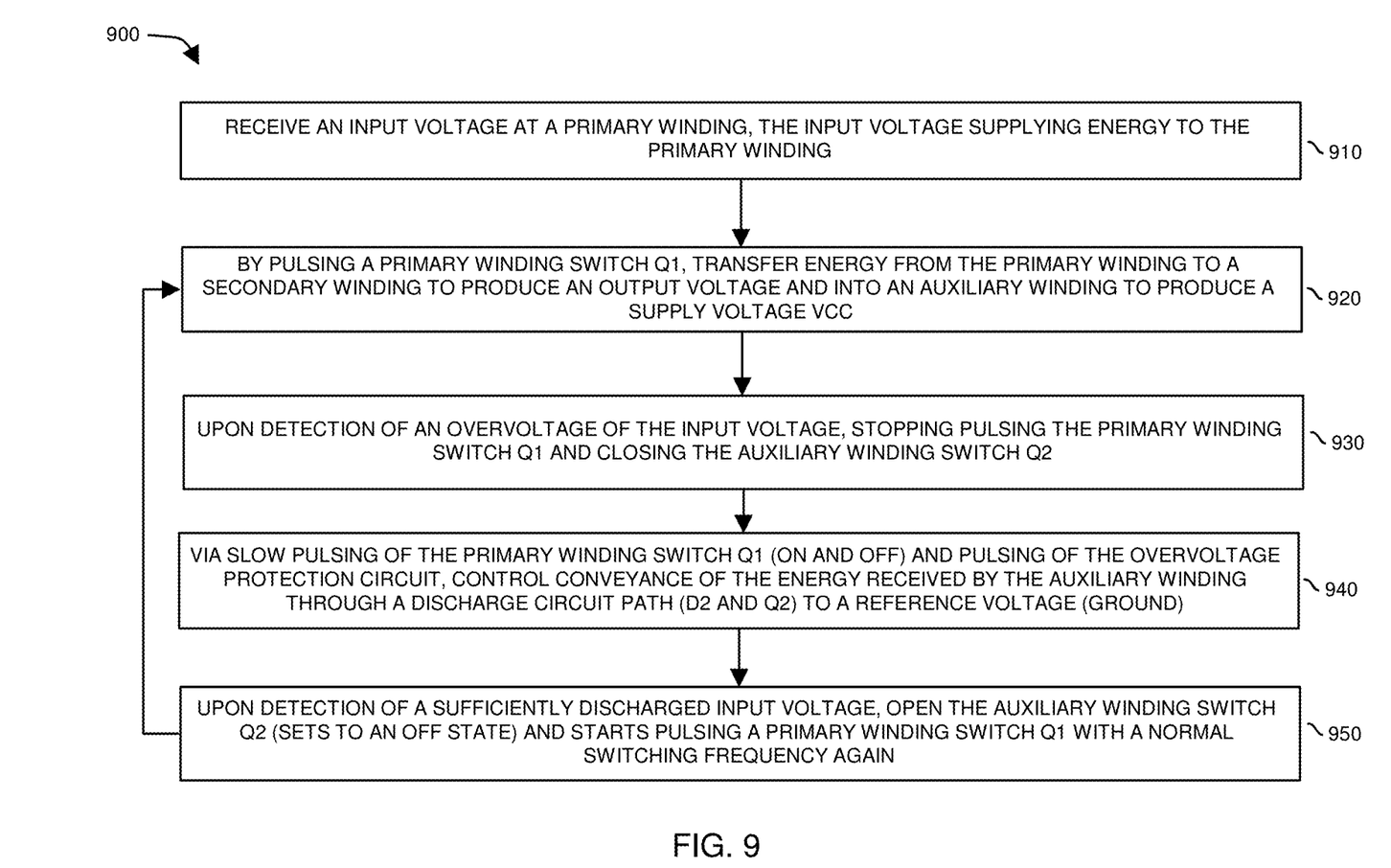
FIG. 9 is an example diagram illustrating a method according to embodiments herein.

FIG. 9 is an example diagram illustrating a method of controlling a power converter according to embodiments herein.

In processing operation 910 of flowchart 900, the voltage converter 135 receives an input voltage 120 at a primary winding 161, the input voltage 120 supplying energy to the primary winding 161.

In processing operation 920, by pulsing a primary winding switch Q1, the controller 140 transfers energy: i) from the primary winding 161 to a secondary winding 162 to produce an output voltage 123 and ii) into an auxiliary winding 164 to produce a supply voltage Vcc.

In processing operation 930, upon detection of an overvoltage of the input voltage 120, the controller 140 stops pulsing the primary winding switch Q1 and closes the auxiliary winding switch Q2.

In processing operation 940, via slow pulsing of the primary winding switch Q1 (ON and OFF) and pulsing of the overvoltage protection circuit 125, the controller 140 controls conveyance of the energy received by the auxiliary winding 163 through a discharge circuit path (D2 and Q2) to a reference voltage (ground).

In processing operation 950, upon detection of a sufficiently discharged input voltage 120, the controller 140 opens the auxiliary winding switch Q2 (sets to an OFF state) and starts pulsing a primary winding switch Q1 with a normal switching frequency again. Loop to operation 920.

Note again that techniques herein are well suited for use in circuit applications such as those that implement power conversion and over-voltage protection. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
    receiving an input voltage at a primary winding, the input voltage supplying energy to the primary winding;
    at an auxiliary winding magnetically coupled to the primary winding, receiving the energy from the primary winding; and
    via an over-voltage protection circuit, in response to sensing that the input voltage at the primary winding is above a threshold value, conveying the energy received by the auxiliary winding through a discharge circuit path to a reference voltage.

2. The method as in claim 1, wherein the conveyance of the energy received by the auxiliary winding through the discharge circuit path reduces a magnitude of the input voltage supplied to the primary winding.

3. The method as in claim 1 further comprising:
    storing the input voltage in a capacitor; and
    via conveyance of the energy received from the auxiliary winding through the discharge circuit path, discharging the capacitor, the discharging reducing a magnitude of the input voltage supplied to the primary winding.

4. The method as in claim 1 further comprising:
    in response to detecting that the input voltage is above the threshold value, activating a switch in communication with a node of the auxiliary winding, activation of the switch to an ON state producing the discharge circuit path extending from a capacitor storing the input voltage through a combination of the primary winding, the auxiliary winding, and the switch to the reference voltage.

5. The method as in claim 4, wherein the auxiliary winding is a first auxiliary winding, the method further comprising:
    supplying power from the first auxiliary winding and a second auxiliary winding to the over-voltage protection circuit at different times depending on a magnitude of the input voltage.

6. The method as in claim 5 further comprising:
    powering the over-voltage protection circuit via power received from the first auxiliary winding during first conditions in which a magnitude of the input voltage is below a threshold value; and
    powering the over-voltage protection circuit via power received from the second auxiliary winding during second conditions in which the magnitude of the input voltage is above the threshold value.

7. The method as in claim 5, wherein a respective voltage produced by the second auxiliary winding tracks a magnitude of the input voltage.

8. The method as in claim 1 further comprising:
    via a second winding magnetically coupled to the primary winding, producing an output voltage to power a dynamic load.

9. The method as in claim 1, wherein a turn ratio of the primary winding to the auxiliary winding is X turns to 1 turn, where X is greater than 5.

10. The method as in claim 1 further comprising:
    via a switch, control a flow of current sourced from the input voltage through the primary winding; and
    reducing a duration of activating the switch in response to detecting that a magnitude of the input voltage is above the threshold value.

11. The method as in claim 10, wherein reducing a duration of activating the switch includes:
    adjusting a frequency of activating the switch; and
    adjusting a pulse width of activating the switch.

12. An apparatus comprising:
    a primary winding operative to receive an input voltage, the input voltage supplying energy to the primary winding;
    an auxiliary winding magnetically coupled to the primary winding, the auxiliary winding operative to receive the energy from the primary winding; and
    an over-voltage protection circuit operative to, in response to sensing that the input voltage at the primary winding is above a threshold value, convey control conveyance of the energy received by the auxiliary winding through a discharge circuit path to a reference voltage.

13. The apparatus as in claim 12, wherein the conveyance of the energy received by the auxiliary winding through the discharge circuit path reduces a magnitude of the input voltage supplied to the primary winding.

14. The apparatus as in claim 12 further comprising:
    a capacitor operative to store the input voltage; and
    wherein conveyance of the energy received from the auxiliary winding through the discharge circuit path discharges the capacitor, reducing a magnitude of the input voltage supplied to the primary winding.

15. The apparatus as in claim 12, wherein the over-voltage protection circuit includes:
    a switch in communication with a node of the auxiliary winding; and
    a controller operative to activate the switch to an ON state in response to detecting that the input voltage is above the threshold value, activation of the switch to the ON state producing the discharge circuit path, the discharge circuit path extending from a capacitor storing the input voltage through a combination of the primary winding, the auxiliary winding, and the switch to the reference voltage.

16. The apparatus as in claim 15, wherein the auxiliary winding is a first auxiliary winding, the apparatus further comprising:
a second auxiliary winding magnetically coupled to the primary winding; and
wherein the first auxiliary winding and the second auxiliary winding supply power to the over-voltage protection circuit at different times depending on a magnitude of the input voltage.

17. The apparatus as in claim 16, wherein the first auxiliary winding powers the over-voltage protection circuit during first conditions in which a magnitude of the input voltage is below a threshold value; and
wherein the second auxiliary winding powers the over-voltage protection circuit during second conditions in which the magnitude of the input voltage is above the threshold value.

18. The apparatus as in claim 16, wherein a voltage produced by the second auxiliary winding tracks a magnitude of the input voltage.

19. The apparatus as in claim 12 further comprising:
a secondary winding magnetically coupled to the primary winding, the secondary winding producing an output voltage to power a dynamic load.

20. The apparatus as in claim 12, wherein the auxiliary winding is a first auxiliary winding, the apparatus further comprising:
a second auxiliary winding magnetically coupled to the primary winding; and
wherein the first auxiliary winding and the second auxiliary winding supply power to the over-voltage protection circuit at different times depending on a magnitude of the input voltage.

21. The apparatus as in claim 20, wherein the first auxiliary winding is operative to power the over-voltage protection circuit during first conditions in which a magnitude of the input voltage is below a threshold value; and
wherein the second auxiliary winding is operative to power the over-voltage protection circuit during second conditions in which the magnitude of the input voltage is above the threshold value.

22. The apparatus as in claim 20, wherein the second auxiliary winding is operative to produce a voltage that tracks a magnitude of the input voltage.

23. The apparatus as in claim 12, wherein the over-voltage protection circuit is further operative to:
compare a magnitude of a received signal to the threshold value, the received signal indicative of a magnitude of the input voltage.

24. The apparatus as in claim 12, wherein the conveyance of the energy through the discharge circuit path is operative to prevent damage to a respective power converter circuit during exposure of the input voltage to a power surge condition.

25. The apparatus as in claim 12, wherein the over-voltage protection circuit is further operative to:
monitor a magnitude of a current supplied to the primary winding.

26. The apparatus as in claim 12, wherein the over-voltage protection circuit is further operative to:
pulse current through the primary winding during the conveyance of the energy received by the auxiliary winding through the discharge circuit path, the pulsing of the current operative to produce an output voltage from a secondary winding magnetically coupled to the primary winding.

27. The apparatus as in claim 12, wherein the over-voltage protection circuit is further operative to: pulse a switch ON and OFF, activation of the switch to the ON-state causing current from the auxiliary winding to be discharged through the switch to the reference voltage.

28. The apparatus as in claim 12 further comprising:
a diode disposed between the discharge circuit path and a supply voltage input pin of the over-voltage protection circuit, the over-voltage protection circuit powered via a supply voltage received at the supply voltage input pin through the diode.

29. The apparatus as in claim 12, wherein the discharge circuit path includes a series circuit path including a diode and a switch, the series circuit path disposed between a supply voltage input of the over-voltage protection circuit and the reference voltage, a supply voltage received at the supply voltage input powering the over-voltage protection circuit.

30. Computer-readable storage media having instructions stored thereon, the instructions, when executed by computer processor hardware, cause the computer processor hardware to:
receive an input voltage at a primary winding, the input voltage supplying energy to the primary winding;
at an auxiliary winding magnetically coupled to the primary winding, receive the energy from the primary winding; and
via an over-voltage protection circuit, in response to sensing that the input voltage at the primary winding is above a threshold value, convey the energy received by the auxiliary winding through a discharge circuit path to a reference voltage.

* * * * *

UNITED STATES PATENT AND TRADEMARK OFFICE
CERTIFICATE OF CORRECTION

| | |
|---|---|
| PATENT NO. | : 11,205,950 B2 |
| APPLICATION NO. | : 16/795072 |
| DATED | : December 21, 2021 |
| INVENTOR(S) | : Tiam Poh Lau and Marcus Schaemann |

It is certified that error appears in the above-identified patent and that said Letters Patent is hereby corrected as shown below:

In the Claims

Column 16, Line 46, Claim 12 delete "control"

Column 16, Line 47, Claim 12 delete "conveyance of"

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*